United States Patent
Honkala et al.

(10) Patent No.: US 6,785,287 B1
(45) Date of Patent: Aug. 31, 2004

(54) INTEGRATED IP TELEPHONY AND CELLULAR COMMUNICATION SYSTEM AND METHOD OF OPERATION

(75) Inventors: Hannu Honkala, Tampere (FI); Mika Lähteenmäki, Tampere (FI); Jari Välimaa, Tampere (FI)

(73) Assignee: Nokia IP, Inc., Mountain View, CA (US)

( * ) Notice: Subject to any disclaimer, the term of this patent is extended or adjusted under 35 U.S.C. 154(b) by 0 days.

(21) Appl. No.: 09/441,091

(22) Filed: Nov. 16, 1999

(51) Int. Cl.[7] ............................ H04L 12/28; H04B 7/00
(52) U.S. Cl. ..................... 370/401; 370/310.2; 370/352; 709/206
(58) Field of Search ............................ 370/310.2, 328, 370/331, 352, 353, 354, 355, 356, 360, 363, 379, 401, 389; 709/206

(56) References Cited

U.S. PATENT DOCUMENTS

| | | | |
|---|---|---|---|
| 5,422,878 A | | 6/1995 | Kimoto et al. |
| 6,128,304 A | * | 10/2000 | Gardell et al. |
| 6,185,288 B1 | * | 2/2001 | Wong |
| 6,363,065 B1 | * | 3/2002 | Thornton et al. |
| 6,404,746 B1 | * | 6/2002 | Cave |
| 6,421,339 B1 | * | 7/2002 | Thomas |
| 6,430,176 B1 | * | 8/2002 | Christie, IV |
| 6,463,307 B1 | * | 10/2002 | Larsson |
| 6,519,249 B1 | * | 2/2003 | Bennefeld et al. |
| 6,539,237 B1 | * | 3/2003 | Sayers et al. |

OTHER PUBLICATIONS

Wanjiun Liao: "Mobile Internet telephony: mobile extensions to H.323", INFOCOM '99. Eighteenth Annual Join Conference of the IEEE Computer and Communications Societies. Proceedings. IEEE New York, NY, USA Mar. 1–25, 1999, Piscataway, NJ, USA, IEEE US, Mar. 21, 1999, pp. 12–19 ISBN: 0–7803–5417–6.

Ychiyama Y., et al: "Network functions and signalling for personal roaming between digital cellular standards", 1995 Fourth IEEE International Conference on Universal Personal Communications Record. Gateway to the 21$^{st}$ Centruy, Tokyo, Nov. 6–10, 1995, IEEE International Conference on Universal Personal Communications, New York, IEEE, US, vol. CONF. 4, Nov. 6, 1995, pp. 447–451, XP 010160579 ISBN: 0–7803–2955–4.

* cited by examiner

*Primary Examiner*—Afsar Qureshi
(74) *Attorney, Agent, or Firm*—Antonelli, Terry, Stout & Kraus, LLP (57) ABSTRACT

The invention is a system and method of initiating a communication which is transmitted by a packet data network (14), containing an optional gateway (24) and a plurality of gatekeepers (GK) to a wireless terminal (18) in one of a plurality of wireless systems. A method in accordance with the invention includes processing information relating to the communication to determine at least one area in which the communication is to be broadcast to the wireless terminal; identifying from the at least one area at least one associated destination gatekeeper to which a message should be transmitted from the gateway to initiate the communication and to which the communication is transmitted; transmitting the message from the gateway to the at least one associated destination gatekeeper; and transmitting the message from the at least one associated destination gatekeeper to at least one of the plurality of wireless systems.

59 Claims, 10 Drawing Sheets

| PAGING AREA | GATE KEEPER | GK IP ADD |
|---|---|---|
| 1002 | 1002 | XXX |
| 1005 | 1005 | XXX |
| 1006 | 1006 | XXX |

OTHER INFORMATION

FIG. 8

| LAC | GATE KEEPER | GK IP ADD |
|---|---|---|
| 1001 | GK_1002 | XXX |
| 1002 | GK_1002 | XXX |
| 1003 | GK_1002 | XXX |
| 1005 | GK_1006 | XXX |
| 1006 | GK_1006 | XXX |
| 1007 | GK_1006 | XXX |

OTHER INFORMATION

| LAC | GATE KEEPER | GK IP ADD |
|---|---|---|
| 1002 | GK_1002 | XXX |
| 1002 | GK_1003 | XXX |
| 1002 | GK_1005 | XXX |
| 1006 | GK_1006 | XXX |
| 1006 | GK_1008 | XXX |
| 1006 | GK_1009 | XXX |
| OTHER INFORMATION | | |

INTEGRATED IP TELEPHONY AND CELLULAR COMMUNICATION SYSTEM AND METHOD OF OPERATION

BACKGROUND OF THE INVENTION

1. Field of the Invention

The present invention relates to a communication originating network and a packet data network through which the communication is transmitted and more particularly, minimizing communications in the packet data network necessary to complete initiation of the communication.

2. Description of the Prior Art

The GSM (global system for mobile communications) utilizes the concept of location area code (LAC) to reduce unnecessary paging messages between a MSC (mobile switching center or mobile services switching center) and a BSC (base station controller). In the GSM system, a mobile terminated call procedure is initiated by the MSC by sending a paging message pursuant to GSM 08.808 Version 5.6.2, 3.2.1.19, to the BSS (base station subsystem) i.e. base station controller. The paging message contains information, including the IMSI (international mobile subscriber identity) or the TMSI (temporary mobile subscriber identity), of the mobile terminal to be paged as well as the so-called cell identifier list pursuant to GSM 08.808, Version 5.6.2, 3.2.2.27. The cell identifier list may contain various types of information describing the target paging area.

Figure 1:
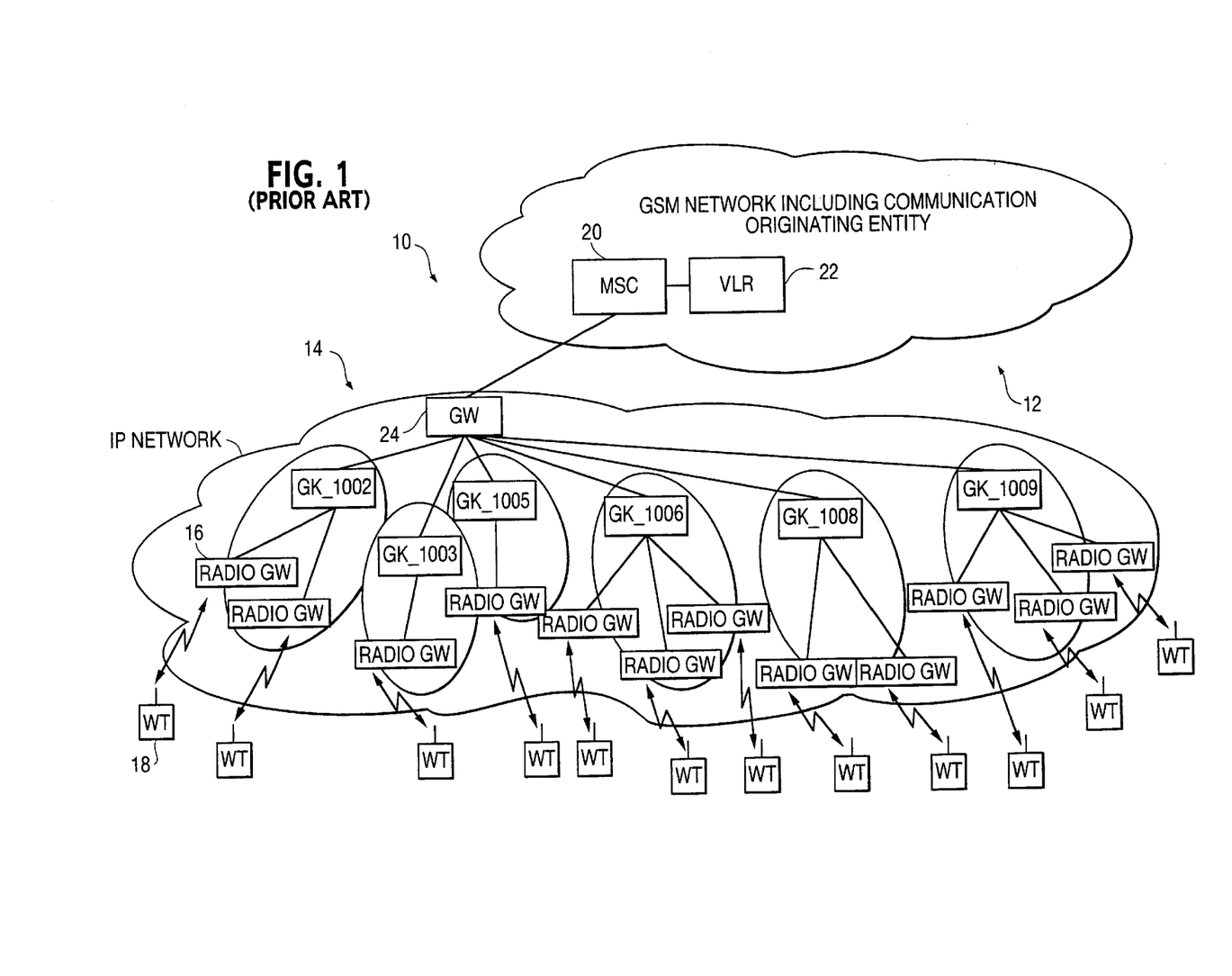
FIG. 1 illustrates a prior art communication system and packet data network which delivers communications to wireless terminals.

FIG. 1 illustrates a prior art system 10 which originates calls in a communication system 12, which is a GSM network including a communication originating entity, which are transmitted through a packet data network 14, which is an IP network, to one of a plurality of radio communication systems 16, which comprise a radio gateway, to one of a plurality of wireless terminals 18 which are part of the GSM network. The communication system 12 includes a MSC 20 and VLR (visiting location register) 22 which functions as a database identifying all wireless terminals 18 which are operational within the area of the communication system 12 under the control of the MSC. The VLR 22 functions to maintain information regarding roaming of the wireless terminals within the communication system 12. Furthermore, a HLR (home location register not illustrated) is used in the GSM system to keep track of where the VLR is maintained in the GSM system, namely the MSC 20 through which calls should be directed to a particular wireless terminal 18. In view of the HLR knowing the VLR's location in the GSM system, a call directed to a wireless terminal 18 which originates in the communication system 12 may be directed through the MSC 20 and then to the packet data network 14, one or more radio communication systems 16 and to one or more wireless terminals 18.

An originated call generates a paging message which is directed to the MSC 20 and is forwarded to gateway 24 within the packet data network 14 to all of the gatekeepers GK 1002, 1003, 1005, 1006, 1008 and 1009 connected thereto. The gatekeepers GK perform a number of functions including the function of a PBX. The gateway and gatekeepers GK operate in compliance with H.323. The paging message to set up a communication to at least one wireless terminal 18 is further forwarded to each of the radio gateways 16 and is finally forwarded to each of the wireless terminals 18. The radio gateways 16 function as access points to wireless local area networks which are not illustrated and control connectivity of communications forwarded through the packet data network 14 to individual terminals 18.

The location of the individual wireless terminals 18 is automatically updated as a result of the radio communications systems 16 being part of the GSM network 12. Operation of the wireless terminals 18 in the GSM network permits the individual wireless terminals 16 to be located by accessing of information within the VLR 22.

The prior art system of FIG. 1 has the disadvantage of transmitting a paging message to set up an individual communication (e.g. telephone call) which is to be terminated at a wireless terminal 18 through each of the gatekeepers 1002, 1003, 1005, 1006, 1008, and 1009. This paging procedure is highly inefficient because, in effect, every GK connected to gateway 24 must be paged and in turn, every radio communication system 16 must be paged in order to complete the call set up procedure. This results in a significant amount of signalling traffic.

SUMMARY OF THE INVENTION

The present invention is a system and a method of initiating a communication which is transmitted by a packet data network containing at least a plurality of gatekeepers and preferably, a gateway coupled to the plurality of gatekeepers to a wireless terminal in one of a plurality of wireless systems. In accordance with the invention, communication initiation messages or paging messages are sent only to one or more gatekeepers within a paging area or LAC in which a wireless terminal to which the communication is directed is known to be located by the packet data network. A location register/directory service, which may be located any where in the packet data network, stores an association between one or more gatekeepers and one or more paging areas or LACs which are identified by processing of the information contained in the communication. Upon receipt of a message from within the packet data network or from an external communication system originating the communication, the packet data network determines from the message or page directed to a gatekeeper or to the gateway, when the communication originates from the external network, a particular paging area or LAC in which the communication initiation message or page is to be transmitted to initiate the communication. The location register/directory service associates the paging area or LAC determined from the communication initiation message or page with one or more gatekeepers to which the communication initiation message or paging message is to be directed which eliminates the problem of the prior art of sending paging messages to all gatekeepers which requires significant signalling traffic for the setting up of communications. As a result, the communication initiation message or paging message is transmitted to one or more gatekeepers which are located within the area determined from the communication initiation message or paging message.

The preferred contents of the location register/directory service of the packet data network contain an identification of each of the gatekeepers located in the packet data network, the gatekeeper's address (packet data network or IP address) and the association of one or more gatekeepers with one or more paging areas or LACs. This information makes possible the transmission of the communication initiation or paging message to the correct one or more gatekeepers by the processing of the information within the received communication initiation or paging message to identify the paging area or LAC in which the one or more gatekeepers are located to which the communication initiation message or paging message is to be transmitted at the packet data address of the one or more gatekeepers stored therein. The paging area or LAC is a key which locates the address of the particular gatekeeper(s) to which the communication initiation message or paging message is sent. Thereafter, the communication initiation message or paging message is forwarded to one or more radio systems (radio gateways) associated with each gatekeeper to complete the initiation of the communication with the wireless terminal to receive the communication without requiring communications with all of the gatekeepers located in the packet data network.

A method of initiating a communication which is transmitted by a packet data network, containing a gateway and a plurality of gatekeepers coupled to the gateway, to a wireless terminal in one of a plurality of wireless systems in accordance with the invention includes processing information relating to the communication to determine at least area in which the communication is to be broadcast to the wireless terminal; identifying from the at least area at least one associated destination gatekeeper to which a message should be transmitted from the gateway to initiate the communication and to which the communication is transmitted; transmitting the message from the gateway to the at least one associated destination gatekeeper; and transmitting the message from the at least one associated destination gatekeeper to at least one of the plurality of wireless systems. A single gatekeeper may be associated with an area and the message may be transmitted from the gateway to each single gatekeeper associated with each identified at least one area; a single gatekeeper may be associated with a plurality of areas and the message may be transmitted from the gateway to the single gatekeeper associated with the identified plurality of areas; or a plurality of gatekeepers may be associated with a single area and the message may be transmitted from the gateway to the plurality of destination gatekeepers associated with the single area. The communication may originate in a telecommunication network and may be transmitted to the packet data network through the gateway. Each of the wireless systems may comprise a radio access point and a plurality of wireless terminals. The packet data network may include a database which stores information related to each of the plurality of gatekeepers including the association between gatekeepers and areas; and wherein the determination of the at least one destination gatekeeper to which the message is to be transmitted from the gateway may be performed by processing the communication and using the information obtained from the processing to locate the at least one area stored in the database and identifying the at least one destination gatekeeper to which the message is transmitted from the located at least one location area. The stored information further may comprise an address of the at least one destination gatekeeper in the packet data network to which the message is transmitted from the gateway. The telecommunication network may be a cellular network. The wireless terminal may be mobile between areas and the database may be updated with a current area when the mobile terminal moves into a new area which permits the message to be directed to the gatekeeper associated with the area in which mobile terminal is currently located. The communication may originate in a telecommunication network and may be transmitted to the packet data network through the gateway; the mobile terminal may be a terminal in the telecommunication network.

A system in accordance with the invention includes a packet data network including a gateway and a plurality of gatekeepers coupled thereto; a plurality of wireless systems; a plurality of wireless terminals; and a location database which stores at least one area, the at least one area being associated with at least one gatekeeper to which messages are transmitted to initiate a communication and to which the communication is transmitted; and wherein the packet data network processes information within the communication which is directed to at least one of the plurality of wireless terminals and determines at least one area to which a message is to be transmitted to initiate the communication and uses the database to identify from the at least one area at least one destination gatekeeper to which the message is transmitted from the gateway and transmits the message from the gateway to the at least destination gatekeeper and from the at least one destination gatekeeper to at least one of the plurality of wireless systems. A single gatekeeper may be associated with an area and the message is transmitted from the gateway to each single gatekeeper associated with each identified at least one area; a single gatekeeper may be associated with a plurality of areas and the message is transmitted from the gateway to the single gatekeeper associated with the identified plurality of areas; or a plurality of gatekeepers may be associated with a single area and the message is transmitted from the gateway to the plurality of destination gatekeepers associated with the single area. A telecommunication network, coupled to the gateway, may originate and transmit the communication to the gateway. The wireless system may comprise a radio access point. The telecommunication network may comprise a cellular network which maintains a database of areas of the plurality of wireless terminals in the telecommunication network; and wherein the location database obtains the areas stored therein from the database of the telecommunications network. The wireless terminal may be mobile between areas and the database may be updated with a current area when the mobile terminal moves into a new area which permits the message to be directed to the gatekeeper associated with the area in which mobile terminal is currently located. The wireless terminal may be mobile between areas and the database may be updated with a current area when the mobile terminal moves into a new area which permits the message to be directed to the gatekeeper associated with the area in which mobile terminal is currently located.

A method of initiating a communication which is transmitted by a packet data network, containing and a plurality of gatekeepers, to a wireless terminal in one of a plurality of wireless systems includes processing information relating to the communication to determine at least one area in which the communication is to be broadcast to the wireless terminal; identifying from the at least one area at least one associated destination gatekeeper to which a message should be transmitted to initiate the communication and to which the communication is transmitted; transmitting the message to the at least one associated destination gatekeeper; and transmitting the message from the at least one associated destination gatekeeper to at least one of the plurality of wireless systems. A single gatekeeper may be associated with a single area and the message may be transmitted to each single gatekeeper associated with each identified at least one area; a single gatekeeper may be associated with a plurality of areas and the page is transmitted to the single gatekeeper associated with the identified plurality of areas; or a plurality of gatekeepers may be associated with a single area and the message may be transmitted to the plurality of destination gatekeepers associated with the single area. Each of the wireless systems comprises a radio access point and a plurality of wireless terminals. The packet data network includes a database which stores information related to each of the plurality of gatekeepers including the association between gatekeepers and areas; and wherein the determination of the at least one destination gatekeeper to which the message is to be transmitted is performed by processing the communication and using the information obtained from the processing to locate the at least one area stored in the database and identifying the at least one destination gatekeeper to which the message is transmitted. The stored information further may comprise an address of the at least one destination gatekeeper in the packet data network to which the message is transmitted from another gatekeeper.

A system in accordance with the invention includes a packet data network including a plurality of gatekeepers coupled thereto; a plurality of wireless systems; a plurality of wireless terminals; and a location database which stores at least one area, the at least one area being associated with at least one gatekeeper to which messages are transmitted to initiate a communication and to which the communication is transmitted; and wherein the packet data network processes information within the communication which is directed to at least one of the plurality of wireless terminals and determines at least one area to which a message is to be transmitted to initiate the communication and uses the database to identify from the at least one area at least one destination gatekeeper to which the message is transmitted and transmits the message to the at least destination gatekeeper and from the at least one destination gatekeeper to at least one of the plurality of wireless systems. A single gatekeeper may be associated with a plurality of areas and the message may be transmitted from the gateway to the single gatekeeper associated with the identified plurality of areas. The wireless system may comprise a radio access point. The wireless terminal may be mobile between areas and the database may be updated with a current area when the mobile terminal moves into a new area which permits the message to be directed to the gatekeeper associated with the area in which mobile terminal is currently located.

BRIEF DESCRIPTION OF THE DRAWINGS

Like reference numerals identify like parts throughout the drawings.

DESCRIPTION OF THE PREFERRED EMBODIMENTS

Figure 2:
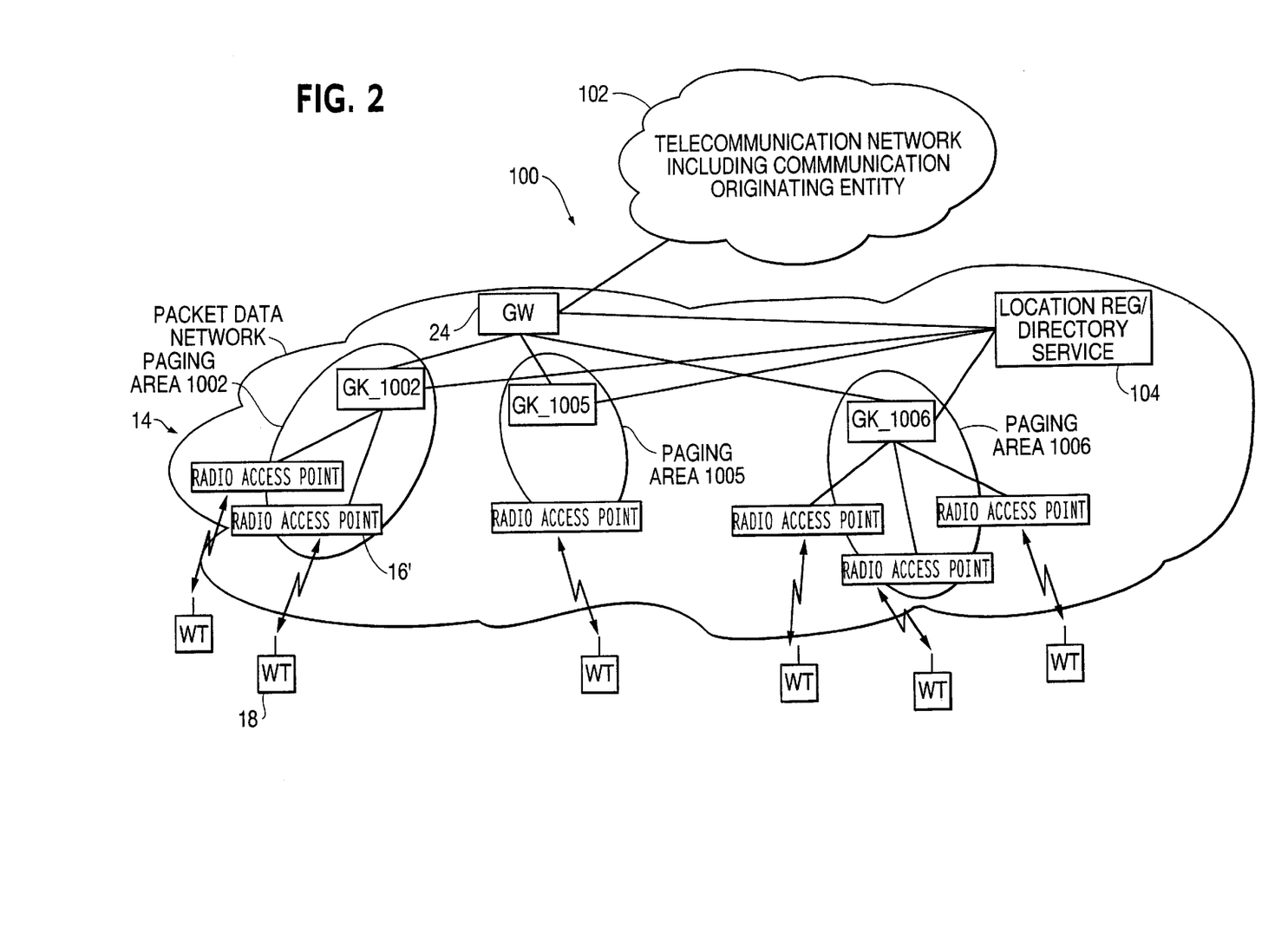
FIG. 2 illustrates a first embodiment of the present invention.

FIG. 2 illustrates a first embodiment 100 of a communication system in accordance with the present invention. A telecommunication network 102, including one or more communication originating entities not individually illustrated, functions as a source of communications to be delivered to wireless terminals 18. The one or more communication entities may be any type of known communication originating device. The radio access points 16' may operate within the communication network 102 if the communication network is in a network, such as the GSM system described above with reference to FIG. 1. Alternatively, the radio access points 16' may be separate from the operation of the communication system 102. The wireless terminals 18 may be mobile and may be multimode devices when operating in both the individual radio access points 16' and the communication network 102 in which the terminals are coresident. However, the wireless terminals 18 do not operate as multimode devices when the radio access points 16' are part of the communication system 102. Furthermore, if the wireless terminals 18 are coresident in the radio access points 16' and in the telecommunication network 102, information stored in the telecommunications network 102, such as in the VLR 22, may be a source of information which is stored in the location register/directory service 104 as described below. The radio access points 16' differ from the radio GWs 16 of the prior art of FIG. 1 in that a radio GW is a true gateway in terms of telecommunication function which converts higher layer protocols to another protocol (e.g. circuit switched protocols to H.323) while a radio access point does not process the higher layers of the communications H.323, TCP/UDP or IP) with only the normal wireline LAN (Ethernet or physical cabling) being changed to a wireless LAN (the physical media is on a broadcast channel). If the wireless terminals 18 are H.323 capable, the wireless terminals communicate directly with the gatekeepers GK through a radio access point 16'. Preferably, the contents of the location register/directory service 104 is derived by processing the message to initiate communication as received by the packet data network 14. The first embodiment 100 functions to direct messages for initiating a communication, which originate from the telecommunications network 102 and are transmitted to the gateway 24, to individual paging areas 1002, 1005, and 1006 depending upon the identification IMSI or TMSI of the wireless terminal contained in the message received from the telecommunication network 102 to which the communication is directed. The location register/directory 104 associates the paging area, which is determined from a processing of the message received from the telecommunications network 102 with at least one destination gatekeeper GK 1002, 1005 and 1006 to which the message is directed to complete the initiation of the communication to one or more wireless terminals 18.

Figure 3:
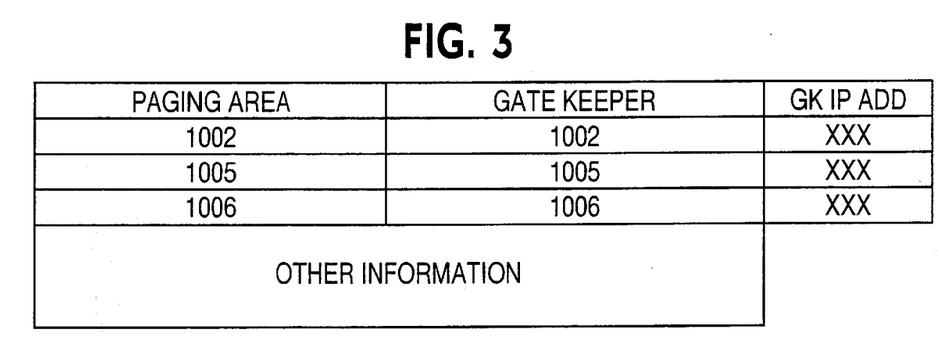
FIG. 3 illustrates the contents of the location register/directory service of the embodiment of FIG. 2.

The location register/directory service 104, which has contents that may be without limitation as illustrated in FIG. 3, associates one or more paging areas with one or more particular gatekeepers GK and an associated gatekeeper packet data network (IP) address. The address provides the address of the particular gatekeeper(s) GK associated with the paging area(s) to which the message is to be sent to initiate the communication through one or more radio access points 16' to one or more wireless terminals 18.

Figure 4:
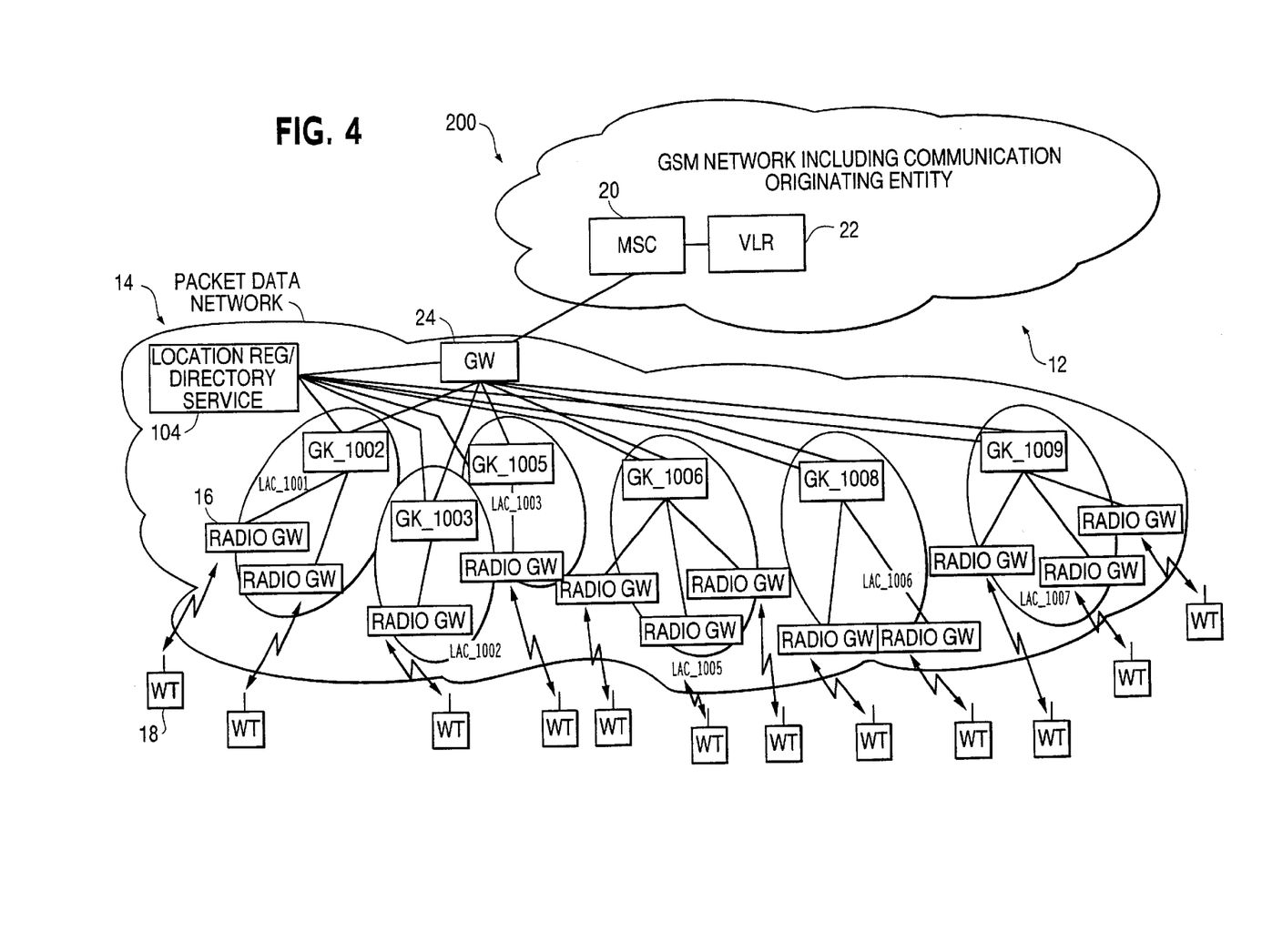
FIG. 4 illustrates a second embodiment of the present invention.

An example of the use of the location register/directory service 104 is as follows. As illustrated in FIG. 4, if a message to initiate a communication is received from the telecommunications network 102 by gateway 24, the message is processed by the gateway or another entity in the packet data network 14 to determine the particular paging area associated with the message. The determination is based upon the inclusion of information, such as or analogous to, an IMSI or TMSI used in GSM in the message which permits an identification of the one or more gatekeepers GK through which the mobile terminal 18 may be reached. After the paging area is determined from processing of the message, such as paging area 1002, the corresponding gatekeeper and gatekeeper IP address is determined from the association between the paging area and gatekeeper GK and gatekeeper IP address as illustrated in FIG. 3. Therefore, with the example of a message to initiate a communication received from the telecommunications network 102 by the gateway 24 which includes an identification of paging area 1002, the gateway 24 accesses the location register/directory service 104 and determines that the message should be sent to the packet data network (IP) address of gatekeeper 1002. Thereafter, gatekeeper 1002 transmits the message to one or more radio access points 16' to complete the set up of the communication with one or more wireless terminals 18. The "other information" may be any additional information which facilitates the initiation of the communications. As may be seen, the processing of the message received from the telecommunication network 102 by the gateway 24 in association with the location register/directory service 102 permits the identification of a desired one or more gatekeepers GK to which the message should be transmitted without requiring the transmission of a message from the gateway 24 to each of the gatekeepers GK in the packet data network 14 as in the prior art.

In the first embodiment the wireless terminal 18 performs a location update procedure. The information of the current location of the wireless terminal, which may be considered to be a paging area, is not stored in any external telecommunication network but, instead in the location register/directory service 104. The location register/directory service 104 may be physically located anywhere in the packet data network 14. When an inbound message to initiate a communication originates from the external telecommunication network 102, the gateway 24 receives a request to setup the communication to the wireless terminal 18. This setup message contains an ID, such as the phone number of the wireless terminal to which the communication is to be transmitted. The gateway 24, in response to the identification of the called entity (wireless terminal 18), sends a query to the location register/directory service 104 which determines the paging area. One or more paging areas are mapped to one or more gatekeepers GK (like second, third and fourth embodiments described below) by either the location register/directory service 104 or the gateway 24.

Figure 5:
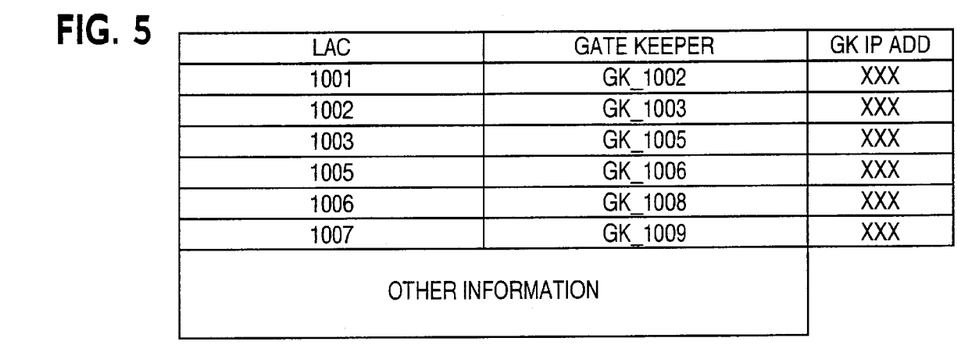
FIG. 5 illustrates the contents of the location register/directory service of the second embodiment.

FIG. 4 illustrates a second embodiment 200 of the present invention which is practiced in conjunction with a cellular communications network such as the GSM network of the prior art of FIG. 1. The second embodiment functions in a manner similar to the first embodiment and has a one to one correspondence stored in the location register/directory service 104 between the LAC determined from processing of the paging request received from the MSC 20 of the GSM network 12 by the gateway 24 and gatekeepers GK 1002, 1003, 1005, 1006, 1008 and 1009 which are to receive the paging message in the LAC. As illustrated in FIG. 5, each LAC 1001, 1002, 1003, 1005, 1006, and 1007 is associated with a single gatekeeper GK. It should be understood that the particular contents of the LAC and the identification of the gatekeeper GK and the gatekeeper IP address may be varied in the practice of the invention with the particular numerical examples being used only for purposes of illustrating the invention.

Figure 6:
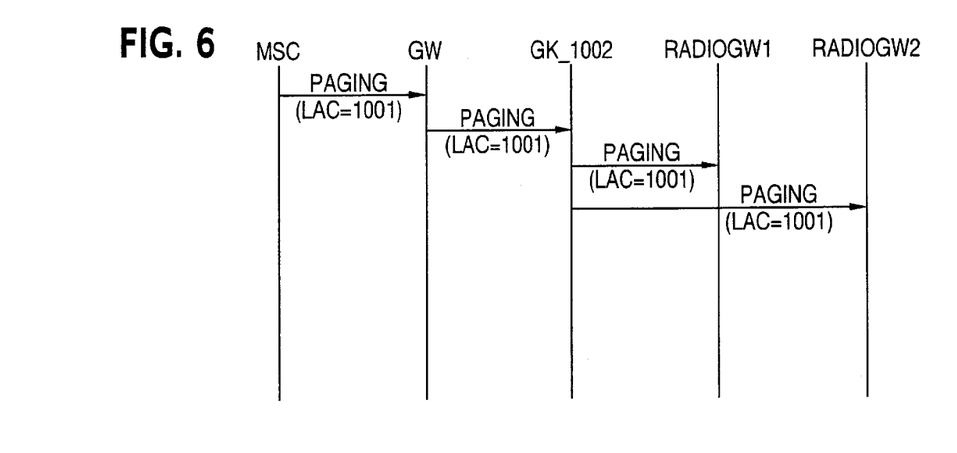
FIG. 6 illustrates the sequence of transmission of a message in the second embodiment.

FIG. 6 illustrates the paging sequence of a paging message directed to LAC 1001 in the second embodiment 200. As illustrated, the paging request originates from the MSC 200 in the GSM network 12 and is transmitted to the gateway 24. Thereafter, upon processing of the paging message, the LAC is determined to be 1001 which has a corresponding gatekeeper GK 1002 having a gatekeeper IP address to which the page is transmitted as illustrated by the transmission from the gateway to the gatekeeper GK 1002. Thereafter the paging message is transmitted from the gatekeeper GK 1002 to each of the radio communication systems 16 therein which are identified as "Radio GW1" and "Radio GW2" in the paging sequence.

Figure 7:
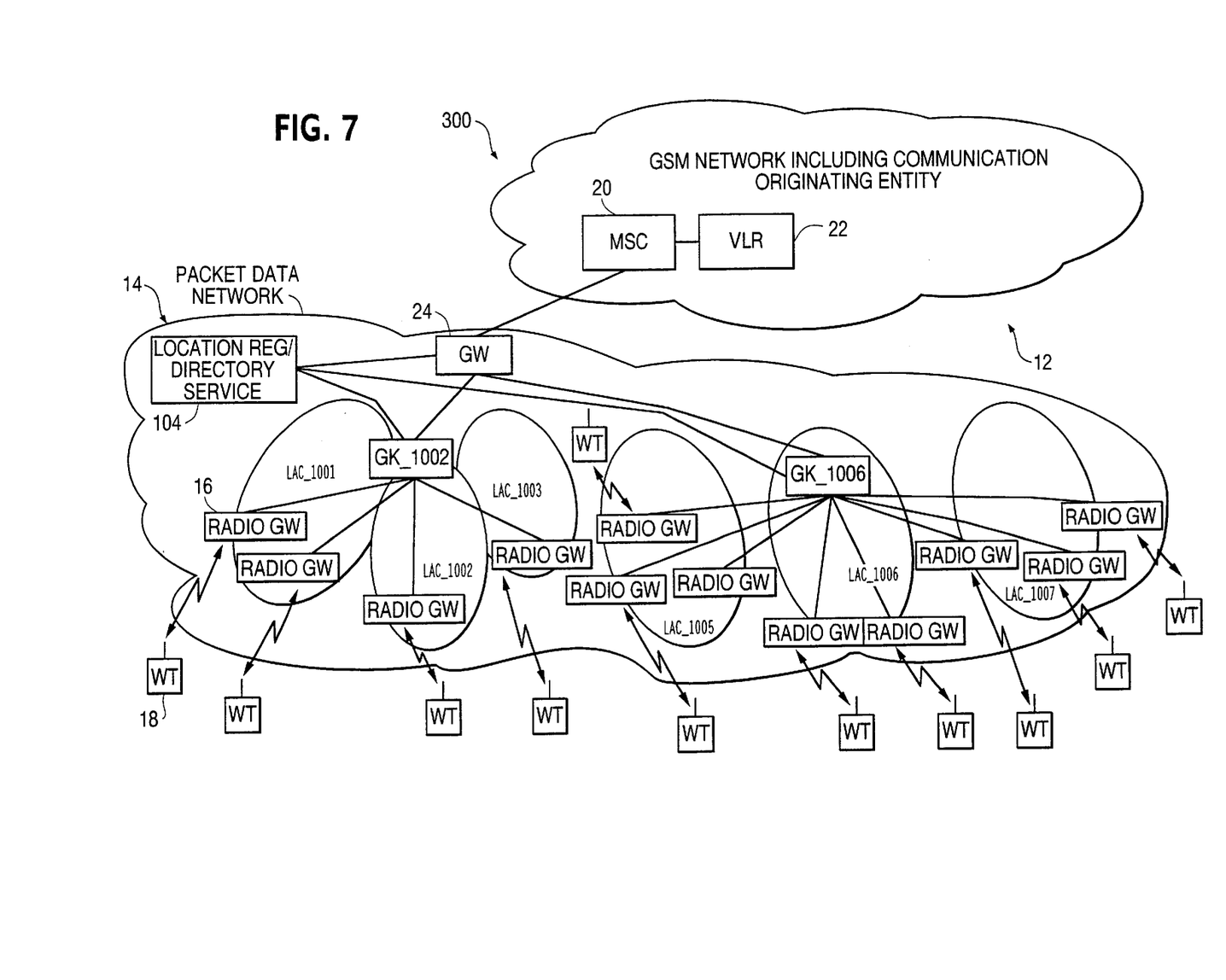
FIG. 7 illustrates a third embodiment of the present invention.
Figure 8:
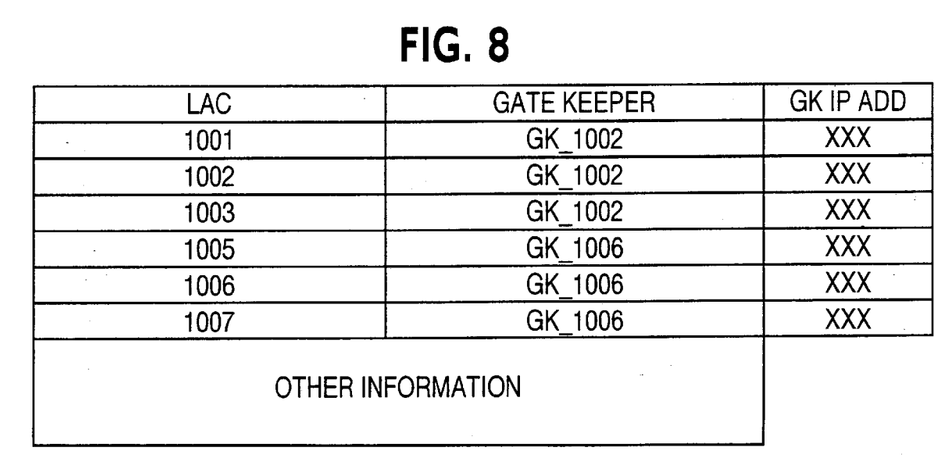
FIG. 8 illustrates the contents of the location register/directory service of the third embodiment.

FIG. 7 illustrates a third embodiment 300 in accordance with the present invention. The operation of the third embodiment 300 is similar to the second embodiment except that, in the illustrated example, a plurality of LACs are associated with each individual gatekeeper, GK 1001, 1002, 1003, 1005, 1006 and 1007. As illustrated in FIG. 8, the location register/directory service 104 has LACs 1001, 1002 and 1003 associated with gatekeeper GK 1002 and LACs 1005, 1006 and 1007 associated with gatekeeper GK 1006. The transmission of a page to a particular gatekeeper GK occurs in this example from a paging request which, when processed, identifies the plurality of LACs associated with each gatekeeper GK which results in the page being sent for a plurality of local area codes to a single gatekeeper IP address.

Figure 9:
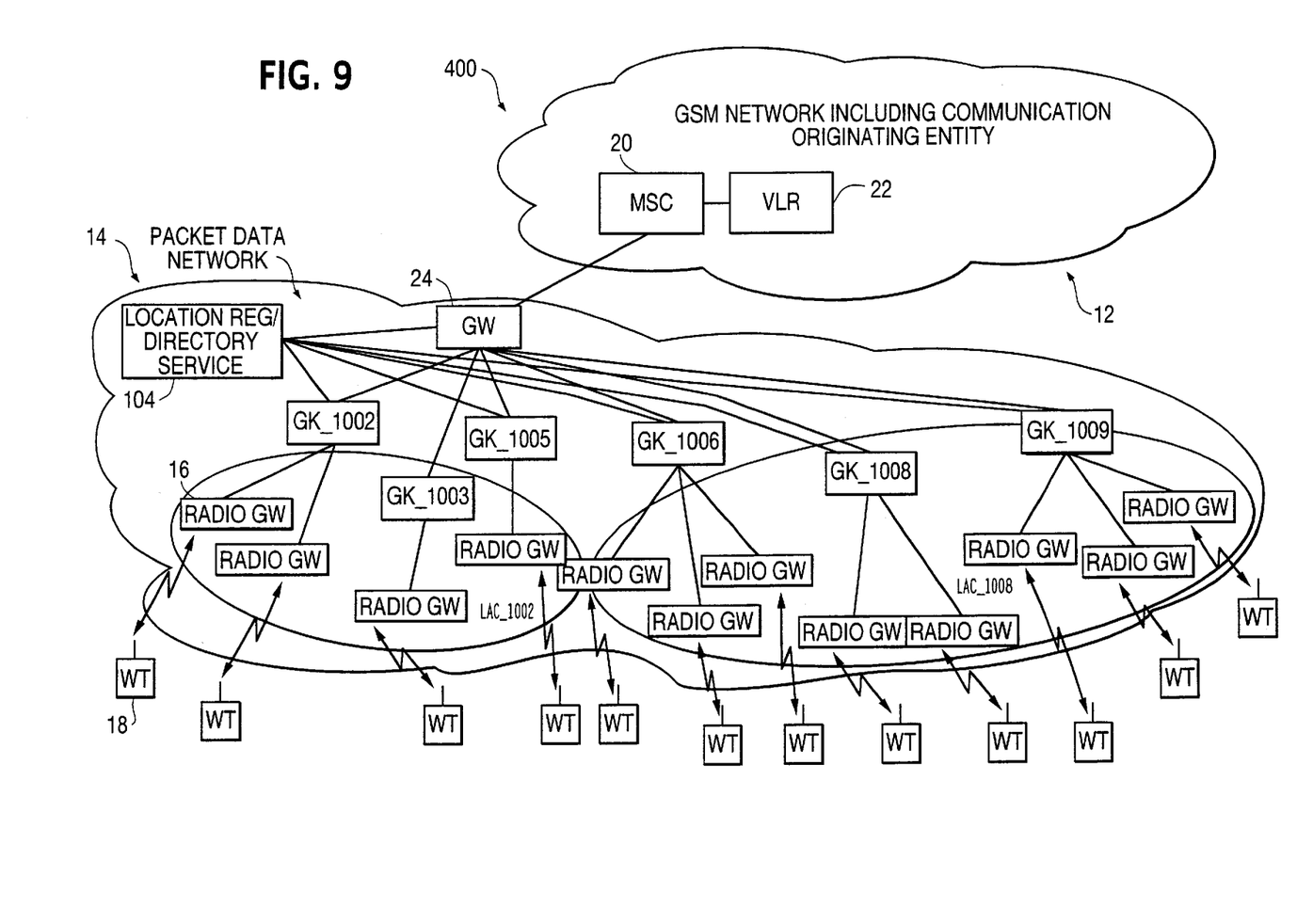
FIG. 9 illustrates a fourth embodiment of the present invention.
Figure 10:
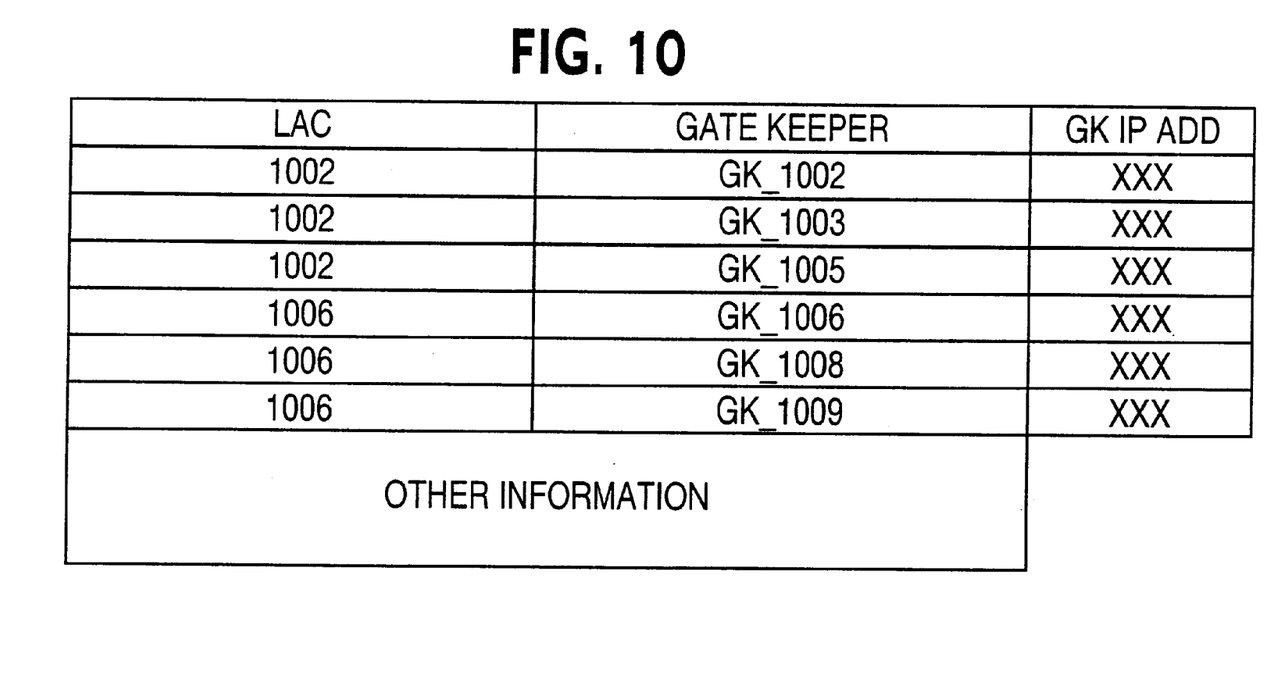
FIG. 10 illustrates the contents of the location register/directory service of the fourth embodiment.

FIG. 9 illustrates a third embodiment 400 in accordance with the present invention which is similar to the second or third embodiments except that a plurality of gatekeepers GK share a single LAC as illustrated in FIG. 10. The LAC 1002 is shared by GKs 1002, 1003, 1005 and LAC 1006 is shared by GKs 1006, 1008 and 1009.

Figure 11:
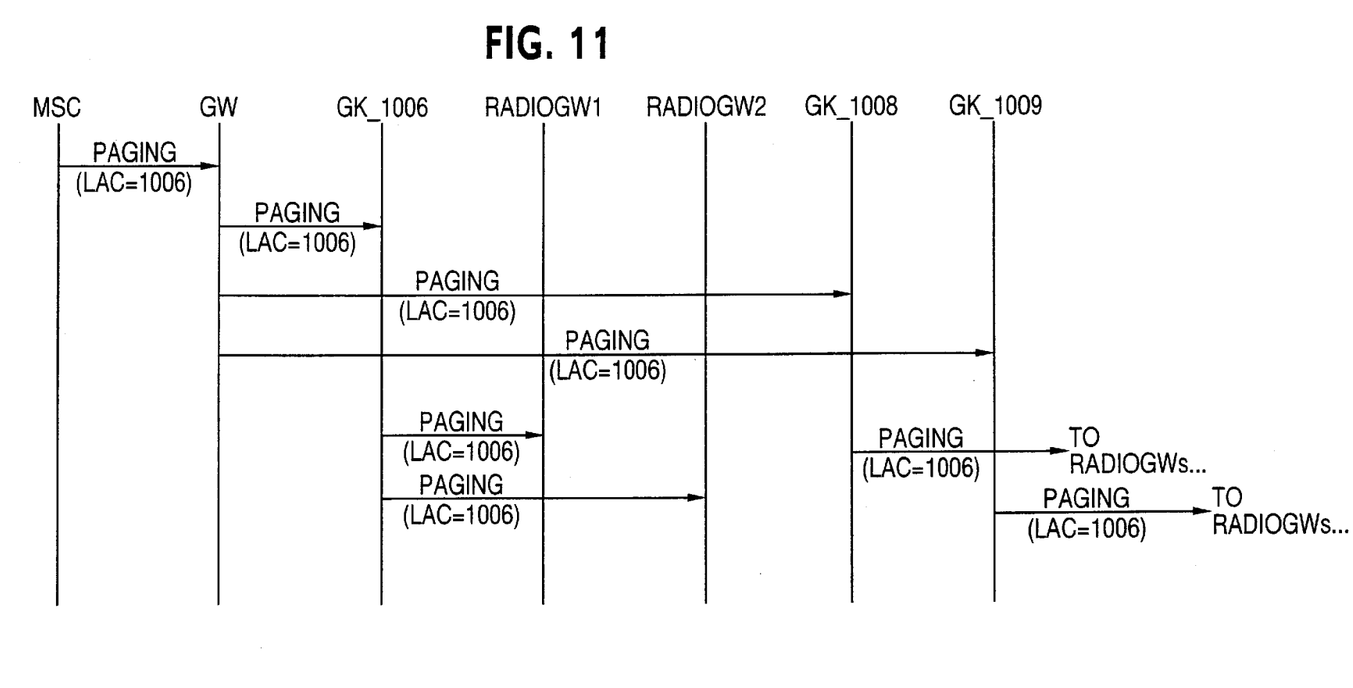
FIG. 11 illustrates the sequence of transmission of a message in the fourth embodiment.

FIG. 11 illustrates the sequence of paging which occurs with the fourth embodiment of FIG. 9. As illustrated, the paging message from the MSC 20 identified LAC 1006 which, in accordance with the table of FIG. 10, upon processing by the IP network 14, results in the gatekeepers GK 1006, 1008 and 1009 being paged followed by paging of the individual radio systems 16 therein.

The difference between the second, third and fourth embodiments as described above involves the association between one or more gatekeepers GK and one or more LACs stored in the location register/directory service 104. The different associations provide the gateway with the ability to parse the LAC identified in the paging message received from the MSC 20 of the GSM network 12 by the gateway 24 and map the paging message to the correct gatekeeper(s) GK and forward the paging message thereto using the address stored in the location register/directory service.

Figure 12:
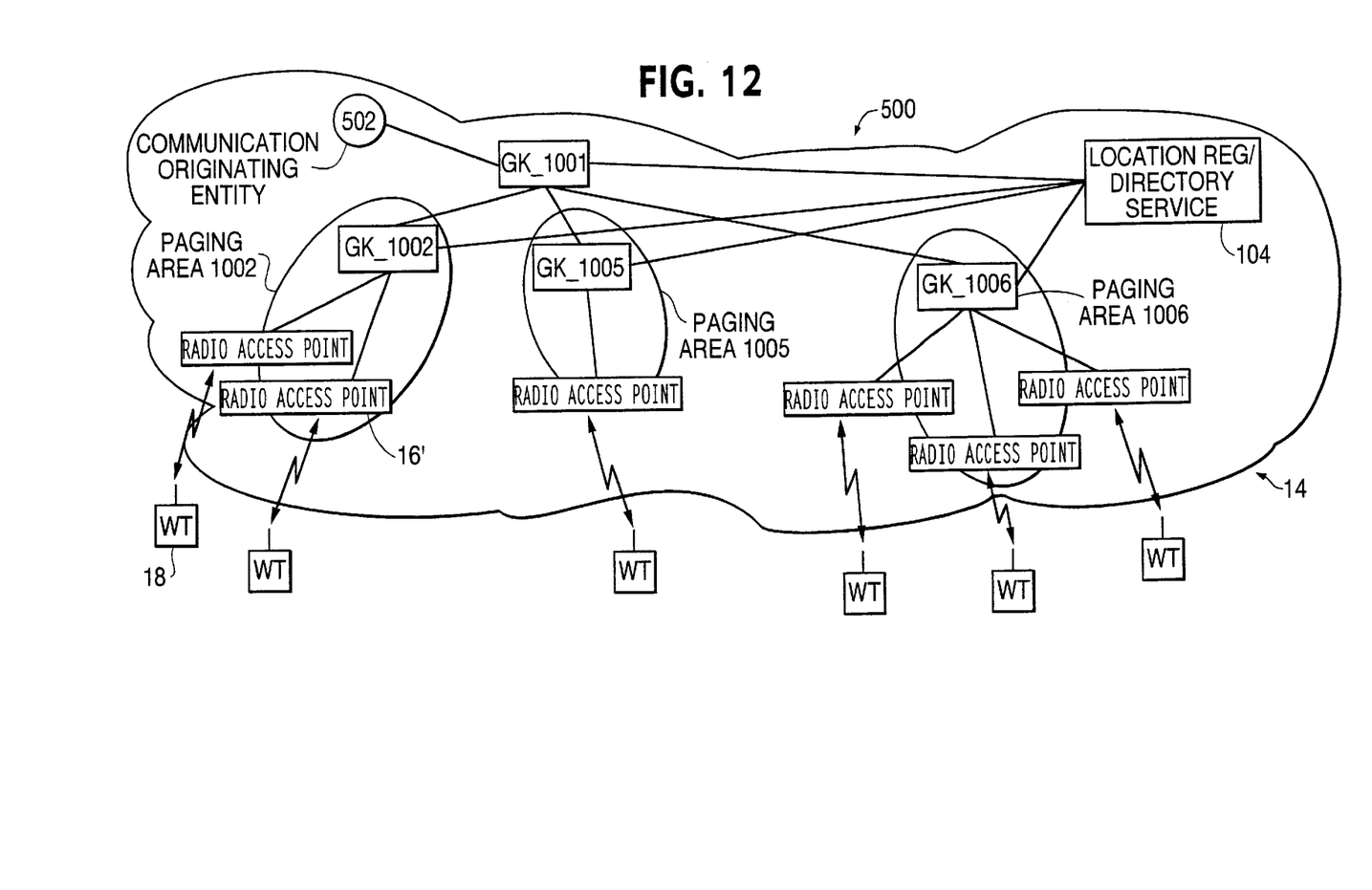
FIG. 12 illustrates a fifth embodiment of the invention which originates communications to be delivered to a wireless terminal from within a packet data network.

FIG. 12 illustrates a fifth embodiment 500 in accordance with the present invention which differs from the preceding embodiments in that the communication is originated within the packet data network 14. A communication originating entity 502 originates a communication for delivery to at least one of the wireless terminals 18 which is transmitted to an associated gatekeeper GK 1001. The gatekeeper GK, in response to identification information contained in the communication received from the communication originating entity 502, determines from the location/register directory 104, which is in accordance with the previous embodiments, where the wireless terminal 18 is located with respect to paging areas 1002, 1005 and 1006. The identification information in the originated communication either contains a LAC, such as that used in the GSM system or an equivalent which permits the association between the LAC or equivalent and the gatekeeper GK to which the page or call set up message should be transmitted. As illustrated, the mapping from the identification information obtained from the communication originated from the communication originating entity 502 performed by the location register/directory service 104 and the paging areas 1002, 1005 and 1006, which are analogous to the paging areas of the embodiment of FIG. 2, permits one or more destination gatekeepers GK 1002, 1005, 1006 to which the page or setup message is to be transmitted to be identified. In this embodiment, it should be understood that the communication originating entity 502 may be a wireline device, a mobile device or one of the wireless terminals 18 which transmits and receives communications in the packet data network 14.

Typical applications of the invention involve the transmission of communications originated outside of a packet data network through the packet data network to at least one radio system or radio access point connected to the packet data network which broadcasts the originated communication to one or more wireless terminals. The efficiency of transmission of the communications using a packet data network to a private radio PBX in the form of the radio communication systems, permits efficient delivery of a telephone communications or other communications to one or more companies which require efficient, inexpensive telecommunication by taking advantage of the low cost delivery capability of packet data networks. In particular applications, each radio communication system may have an associated LAC of its own to permit communications to be mapped to an individual company or entity to prevent communication initiation messages or paging messages from being transmitted to plural companies or entities which are all connected to the packet data network 14.

While the invention has been described in terms of its preferred embodiments, it should be understood that numerous modifications may be made thereto without departing from the spirit and scope of the invention. It is intended that all such modifications fall within the scope of the appended claims.

What is claimed is:

1. A method of initiating a communication which is transmitted by a packet data network, containing a gateway and a plurality of gatekeepers coupled to the gateway, to a wireless terminal in one of a plurality of wireless systems comprising:

processing a message for use in initiation of the communication to determine at least one area to which the message is transmitted;

identifying for the at least one area at least one associated destination gatekeeper to which the message is transmitted from the gateway to initiate the communication and to which the communication is transmitted;

transmitting the message from the gateway to the at least one associated destination gatekeeper; and transmitting the message from the at least one associated destination gatekeeper to at least one of the plurality of wireless systems; and wherein the at least one associated destination gatekeeper is not all of the plurality of gatekeepers.

2. A method in accordance with claim 1 wherein:

a single gatekeeper is associated with a single area and the message is transmitted from the gateway to each single gatekeeper associated with each identified at least one area.

3. A method in accordance with claim 2 wherein:

the communication originates in a telecommunication network and is transmitted to the packet data network through the gateway.

4. A method in accordance with claim 3 wherein:

each of the wireless systems comprises a radio access point and a plurality of wireless terminals.

5. A method in accordance with claim 3 wherein:

the telecommunication network is a cellular network.

6. A method in accordance with claim 2 wherein:

each of the wireless systems comprises a radio access point and a plurality of wireless terminals.

7. A method in accordance with claim 1 wherein:

a single gatekeeper is associated with a plurality of areas and the message is transmitted from the gateway to the single gatekeeper associated with the identified plurality of areas.

8. A method in accordance with claim 7 wherein:

the communication originates in a telecommunication network and is transmitted to the packet data network through the gateway.

9. A method in accordance with claim 8 wherein:

each of the wireless systems comprises a radio access point and a plurality of wireless terminals.

10. A method in accordance with claim 8 wherein:

the telecommunication network is a cellular network.

11. A method in accordance with claim 7 wherein:

each of the wireless systems comprises a radio access point and a plurality of wireless terminals.

12. A method in accordance with claim 1 wherein:

a plurality of gatekeepers are associated with a single area and the message is transmitted from the gateway to the plurality of destination gatekeepers associated with the single area.

13. A method in accordance with claim 12 wherein:

the communication originates in a telecommunication network and is transmitted to the packet data network through the gateway.

14. A method in accordance with claim 13 wherein:

each of the wireless systems comprises a radio access point and a plurality of wireless terminals.

15. A method in accordance with claim 13 wherein:

the telecommunication network is a cellular network.

16. A method in accordance with claim 12 wherein:

each of the wireless systems comprises a radio access point and a plurality of wireless terminals.

17. A method in accordance with claim 1 wherein:

the communication originates in a telecommunication network and is transmitted to the packet data network through the gateway.

18. A method in accordance with claim 17 wherein:

each of the wireless systems comprises a radio access point and a plurality of wireless terminals.

19. A method in accordance with claim 17 wherein:

the telecommunication network is a cellular network.

20. A method in accordance with claim 1 wherein:

each of the wireless systems comprises a radio access point and a plurality of wireless terminals.

21. A method in accordance with claim 1 wherein:

the packet data network includes a database which stores information related to each of the plurality of gatekeepers including the association between gatekeepers and the areas; and wherein the determination of the at least one destination gatekeeper to which the message is to be transmitted from the gateway is performed by processing the message and using the information obtained from the processing to locate the at least one area stored in the database and identifying the at least one destination gatekeeper to which the message is transmitted from the located at least one area.

22. A method in accordance with claim 21 wherein:
the stored information further comprises an address of the at least one destination gatekeeper in the packet data network to which the message is transmitted from the gateway.

23. A method in accordance with claim 21 wherein:
the wireless terminal is mobile between the areas and the database is updated with a current area when the mobile terminal moves into a new area which permits the message to be directed to the gatekeeper associated with the area in which mobile terminal is currently located.

24. A method in accordance with claim 23 wherein:
the communication originates in a telecommunication network and is transmitted to the packet data network through the gateway; and
the mobile terminal is a terminal in the telecommunication network.

25. A system comprising:
a packet data network including a gateway and a plurality of gatekeepers coupled thereto;
a plurality of wireless systems;
a plurality of wireless terminals; and
a location database which stores at least one area, the at least one area being associated with at least one gatekeeper to which a message is transmitted to initiate a communication and to which the communication is transmitted; and wherein
the packet data network processes the message to determine at least one area to which the message is transmitted to initiate the communication and uses the database to identify for the at least one area at least one destination gatekeeper to which the message is transmitted from the gateway, transmits the message from the gateway to the at least destination gatekeeper and from the at least one destination gatekeeper to at least one of the plurality of wireless systems and the at least one destination gatekeeper is not all of the plurality of gatekeepers.

26. A system in accordance with claim 25 wherein:
a single gatekeeper is associated with a single area and the message is transmitted from the gateway to each single gatekeeper associated with each identified at least one area.

27. A system in accordance with claim 26 further comprising:
a telecommunication network, coupled to the gateway, which originates and transmits the communication to the gateway.

28. A system in accordance with claim 27 wherein:
the wireless system comprises a radio access point.

29. A system in accordance with claim 26 wherein:
the wireless system comprises a radio access point.

30. A system in accordance with claim 26 wherein:
the wireless terminal is mobile between the areas and the database is updated with a current area when the mobile terminal moves into a new area which permits the message to be directed to the gatekeeper associated with the area in which mobile terminal is currently located.

31. A system in accordance with claim 25 wherein:
a single gatekeeper is associated with a plurality of areas and the message is transmitted from the gateway to the single gatekeeper associated with the identified plurality of the areas.

32. A system in accordance with claim 31 further comprising:
a telecommunication network, coupled to the gateway, which originates and transmits the communication to the gateway.

33. A system in accordance with claim 32 wherein:
the wireless system comprises a radio access point.

34. A system in accordance with claim 31 wherein:
the wireless system comprises a radio access point.

35. A system in accordance with claim 31 wherein:
the wireless terminal is mobile between the areas and the database is updated with a current area when the mobile terminal moves into a new area which permits the message to be directed to the gatekeeper associated with the area in which mobile terminal is currently located.

36. A system in accordance with claim 25 wherein:
a plurality of gatekeepers are associated with a single area and the message is transmitted from the gateway to the plurality of destination gatekeepers associated with the single area.

37. A system in accordance with claim 36 further comprising:
a telecommunication network, coupled to the gateway, which originates and transmits the communication to the gateway.

38. A system in accordance with claim 37 wherein:
the wireless system comprises a radio access point.

39. A system in accordance with claim 36 wherein:
the wireless system comprises a radio access point.

40. A system in accordance with claim 25 further comprising:
a telecommunication network, coupled to the gateway, which originates and transmits the communication to the gateway.

41. A system in accordance with claim 40 wherein:
the wireless system comprises a radio access point.

42. A system in accordance with claim 40 wherein:
the telecommunication network comprises a cellular network which maintains a database of areas of location of the plurality of wireless terminals in the telecommunication network; and wherein
the location database obtains the areas stored therein from the database of the telecommunications network.

43. A system in accordance with claim 42 wherein:
the wireless terminal is mobile between the areas and the database is updated with a current area when the mobile terminal moves into a new area which permits the message to be directed to the gatekeeper associated with the area in which mobile terminal is currently located.

44. A system in accordance with claim 40 wherein:
the wireless terminal is mobile between the areas and the database is updated with a current area when the mobile terminal moves into a new area which permits the message to be directed to the gatekeeper associated with the area in which mobile terminal is currently located.

45. A system in accordance with claim 25 wherein:
the wireless system comprises a radio access point.

46. A system in accordance with claim 25 wherein:
the wireless terminal is mobile between the areas and the database is updated with a current area when the mobile terminal moves into a new area which permits the message to be directed to the gatekeeper associated with the area in which mobile terminal is currently located.

47. A system in accordance with claim 25 wherein:

the wireless systems comprise radio access points.

48. A system in accordance with claim 25 wherein:

the wireless terminal is mobile between location areas and the database is updated with a current area when the mobile terminal moves into a new area which permits the message to be directed to the gatekeeper associated with the area in which mobile terminal is currently located.

49. A method of initiating a communication which is transmitted by a packet data network, containing a plurality of gatekeepers, to a wireless terminal in one of a plurality of wireless systems comprising:

processing a message for use in initiation of the communication to determine at least one area to which the message is transmitted;

identifying for the at least one area at least one associated destination gatekeeper to which the message is transmitted to initiate the communication and to which the communication is transmitted;

transmitting the message to the at least one associated destination gatekeeper; and transmitting the message from the at least one associated destination gatekeeper to at least one of the plurality of wireless systems; and wherein the at least one associated destination gatekeeper is not all of the plurality of gatekeepers.

50. A method in accordance with claim 49 wherein:

a single gatekeeper is associated with a single area and the message is transmitted to each single gatekeeper associated with each identified at least one location area.

51. A method in accordance with claim 49 wherein:

a single gatekeeper is associated with a plurality of areas and the message is transmitted to the single gatekeeper associated with the identified plurality of areas.

52. A method in accordance with claim 49 wherein:

a plurality of gatekeepers are associated with a single area and the message is transmitted to the plurality of destination gatekeepers associated with the single area.

53. A method in accordance with claim 52 wherein:

each of the wireless systems comprises a radio access point and a plurality of wireless terminals.

54. A method in accordance with claim 49 wherein:

the packet data network includes a database which stores information related to each of the plurality of gatekeepers including the association between gatekeepers and the areas; and wherein the determination of the at least one destination gatekeeper to which the message is to be transmitted from the gateway is performed by processing the message and using the information obtained from the processing to locate the at least one location area stored in the database and identifying the at least one destination gatekeeper to which the message is transmitted from the located at least one area.

55. A method in accordance with claim 54 wherein:

the stored information further comprises an address of the at least one destination gatekeeper in the packet data network to which the message is transmitted from another gatekeeper.

56. A system comprising:

a packet data network including a plurality of gatekeepers coupled thereto;

a plurality of wireless systems;

a plurality of wireless terminals; and a location database which stores at least one area, the at least one area being associated with at least one gatekeeper to which a message is transmitted to initiate a communication and to which the communication is transmitted; and wherein the packet data network processes the message to determine at least one area to which the message is transmitted to initiate the communication and uses the database to identify for the at least one area at least one destination gatekeeper to which the message is transmitted from the gateway, transmits the message to the at least destination gatekeeper and from the at least one destination gatekeeper to at least one of the plurality of wireless systems and the at least one gatekeeper is not all of the plurality of gatekeepers.

57. A system in accordance with claim 56 wherein:

a single gatekeeper is associated with a single area and the message is transmitted to each single gatekeeper associated with each identified at least one area.

58. A system in accordance with claim 56 wherein:

a single gatekeeper is associated with a plurality of areas and the message is transmitted from the gateway to the single gatekeeper associated with the identified plurality of areas.

59. A system in accordance with claim 56 wherein:

a plurality of gatekeepers are associated with a single area and the message is transmitted from the gateway to the plurality of destination gatekeepers associated with the single area.

* * * * *